United States Patent
Mizuno et al.

(10) Patent No.: US 6,268,057 B1
(45) Date of Patent: *Jul. 31, 2001

(54) POLYURETHANE MATERIALS, AND PRODUCTS MOLDED FROM THE POLYURETHANE MATERIALS USING RIM

(75) Inventors: Hisashi Mizuno, Ichinomiya; Satoru Ono, Yoro-gun; Takahiro Yamada, Nagoya, all of (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,302

(22) Filed: Oct. 2, 1998

(30) Foreign Application Priority Data

Oct. 3, 1997 (JP) .................................................. 9-287843

(51) Int. Cl.[7] ...................................................... B32B 27/40
(52) U.S. Cl. ................................... 428/423.3; 428/423.1; 528/44

(58) Field of Search .............................. 428/423.1, 423.3; 528/44, 49, 45

(56) References Cited

U.S. PATENT DOCUMENTS

| | | | |
|---|---|---|---|
| 5,208,334 | * 5/1993 | Potter et al. | 544/193 |
| 5,691,440 | * 11/1997 | Katz et al. | 528/52 |
| 5,962,142 | * 10/1999 | Tachi et al. | 428/423.1 |

FOREIGN PATENT DOCUMENTS 06143340    5/1994    (JP) .

\* cited by examiner

Primary Examiner—D. S. Nakarani
Assistant Examiner—Christopher Paulraj
(74) Attorney, Agent, or Firm—Pillsbury Winthrop LLP

(57) ABSTRACT

A polyurethane material comprising a hexamethylene diisocyanate (HDI) trimer and a polyol is disclosed. Content of oligomer, which is equal to or higher than a pentamer, in said HDI trimer is restricted to 0 to 50% by weight, and 3 to 10% by weight of monool is added to said HDI trimer. The polyurethane material is high in breaking elongation, superior in flexural resistance, and not subject to cracks or breaking.

3 Claims, 5 Drawing Sheets

POLYURETHANE MATERIALS, AND PRODUCTS MOLDED FROM THE POLYURETHANE MATERIALS USING RIM

BACKGROUND OF THE INVENTION

1. Field of the Invention

This invention relates to a polyurethane material and a molded product of polyurethanes molded by a reaction injection molding (RIM) which uses the same material.

2. Description of the Related Art

The applicant developed an invention covering a process for manufacturing a two-colored molded product of polyurethanes by RIM techniques which comprises injecting a small amount of a surface-forming polyurethane material containing a mold release agent, a coloring agent and a catalyst into a mold cavity having a reduced pressure so that it may adhere to the whole surface of the wall of the cavity and form the surface portion of a molded product. Then another polyurethane material is injected into the cavity to form its inner portion (see Japanese Patent Application Laid-open Specification No. 6-143340). This process has made it possible to eliminate the steps of applying the mold release agent and the in-mold coating material to the cavity wall before starting the molding step, and overcomes the problem of a burr formed by the in-mold coating material.

There has, however, been a problem facing the new process, since no polyurethane material that can be considered optimum has been found for use in forming the surface portion of a molded product. The applicant, therefore, further developed an invention covering a process for forming a surface portion from a non-yellowing polyurethane material containing a hexamethylene diisocyanate (HDI) trimer (see Japanese Patent Application No. 9-92930, which is not laid-opened yet). Since an HDI trimer has a ring structure, a polyurethane material using the same shows an improved wear resistance and is able to accelerate the urethane reaction by using a specific catalyst. However, since the molecular chain of the HDI trimer is not straight, there remains a problem that a polyurethane material using a generally available HDI trimer is low in breaking elongation, inferior in flexural resistance, and subject to cracks or breaking.

SUMMARY OF THE INVENTION

It is, therefore, an object of this invention to provide a polyurethane material which is high in breaking elongation, superior in flexural resistance, and not subject to cracks or breaking, and to provide a molded product of polyurethanes molded by RIM techniques which uses the same material.

In a generally available HDI trimer, content of oligomer, which is equal to or higher than a pentamer and which exists in the trimer as impurities, exceeds 50% by weight for 100% by weight of the HDI trimer. The present inventors thought a large amount of the oligomer to be the factor which lowers breaking elongation. And a result of various investigations and examinations, the inventors have completed the present invention.

A polyurethane material of the present invention comprises an HDI trimer and a polyol, wherein content of oligomer, which is equal to or higher than a pentamer, in said HDI trimer is restricted to 0 to 50% by weight, and 3 to 10% by weight of monool is added to said HDI trimer for 100% by weight of said HDI trimer.

A molded product of polyurethanes of the present invention is molded from a polyurethane material by RIM, said polyurethane material comprising an HDI trimer and a polyol, wherein content of oligomer, which is equal to or higher than a pentamer, in said HDI trimer is restricted to 0 to 50% by weight, and 3 to 10% by weight of monool is added to said HDI trimer.

A two-colored molded product of polyurethanes molded by RIM of the present invention comprises: a surface portion formed by injecting a small amount of a surface-forming polyurethane material into a mold cavity under reduced pressure, said material comprising an HDI trimer and a polyol, wherein content of oligomer, which is equal to or higher than a pentamer, in said HDI trimer is restricted to 0 to 50% by weight, and 3 to 10% by weight of monool is added to said HDI trimer; and an optional inner portion formed by injecting an inner-forming polyurethane material into said cavity under reduced pressure.

In the above inventions, "oligomer, which is equal to or higher than a pentamer," means that the number of monomeric units bound in the oligomer is equal or more than the number of monomeric units bound in a pentamer.

The reason why the content of oligomer, which is equal to or higher than a pentamer, is restricted to 0 to 50% by weight is that its content more than 50% by weight lowers breaking elongation of the molded product. The reason why 3 to 10% by weight of monool is added is that its addition less than 3% by weight is insufficient to decrease the number of functional groups, which lowers breaking elongation of the molded product, while its addition more than 10% by weight decreases the network structure, which lowers the wear resistance. It is more preferable to add 4 to 8% by weight of monool.

Monool is not limited to a specific one. For example, it may be at least one selected from the group consisting of 2-ethylhexyl alcohol, n-butanol, isopropanol, ethanol, isobutanol, n-propanol and n-pentanol.

The polyol component can be any of those which are commonly used for RIM, including the polyether and polyester polyols. More specifically, the polyol component may be selected from the group consisting of:

bifunctional, trifunctional or tetrafunctional polyols obtained by reacting cyclic ethers, such as ethylene oxide, propylene oxide, butylene oxide and styrene oxide, with low-molecular polyols, such as ethylene glycol, diethylene glycol, glycerol, trimethylolpropane and bisphenol A, and polymer polyols obtained by the graft polymerization thereof with e.g. vinyl monomers; and polyesters obtained by reacting dicarboxylic acids, such as succinic, glutaric, adipic and piperic acids, with an excess of diols, such as ethylene glycol, polyoxyethylene glycol, dipropylene glycol and polyoxypropylene glycol.

It is preferable to add an organic bismuth catalyst or the following mixed catalyst, which acts specifically on the material using an HDI trimer, to the polyol. The mixed catalyst is a mixture of a first catalyst having the chemical formula

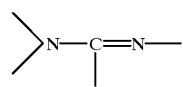

and a second catalyst represented by the chemical formula

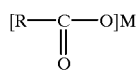

where M stands for an alkali metal or an alkaline earth metal, and R stands for hydrogen, an alkyl group having 1 to 20 carbon atoms, an alkenyl or alkynyl group having 2 to 20 carbon atoms (any of these groups being of the straight or branched chain type, and optionally replaced by one carboxyl group, or one or more halogens), a cycloalkyl group having 3 to 6 carbon atoms [this group being unsubstituted, or replaced by one carboxyl group, or one or more alkyl groups having 1 to 6 carbon atoms, or alkenyl or alkynyl groups having 2 to 6 carbon atoms (any of these groups being of the straight or branched chain type)], or an aryl group [this group being unsubstituted, or replaced by one or more halogens, or one or more alkyl groups having 1 to 8 carbon atoms, or alkenyl or alkynyl groups having 2 to 8 carbon atoms (any of these groups being of the straight or branched chain type), or one aryl group or one carboxyl group] (see U.S. Pat. No. 4,025,466). The organic bismuth catalyst is not limited to a specific one, and it may be at least one selected from the group consisting of bismuth neodecanoate, bismuth isodecanoate and bismuth octylate.

A mold release agent may be added to the polyol as a third component. It is also possible to add a coloring agent to the HDI trimer or the polyol as a third component.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
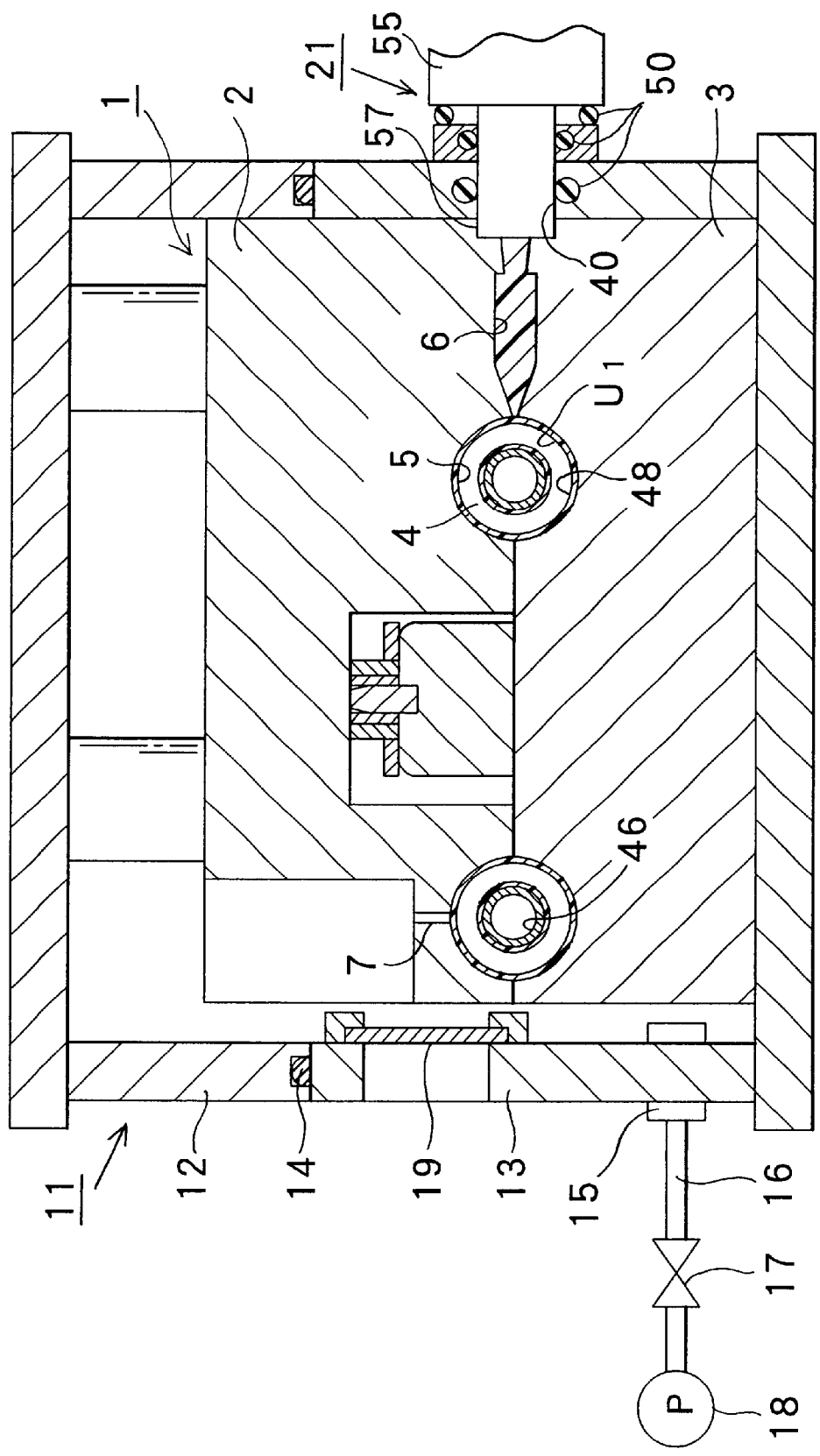
FIG. 1 is a sectional view showing the step of forming a surface portion of a polyurethane covering for a steering wheel in a process according to an embodiment of this invention.

Description will now be made of the reaction injection molding of two-colored polyurethane coverings for steering wheels by processes embodying this invention with reference to FIGS. 1 to 5.

An embodiment of this invention employs a molding apparatus including a mold 1, a vacuum casing 11 and a material injection mechanism 21, as shown in FIGS. 1 to 4, and as will hereinafter be described in detail.

The mold 1 comprises an upper portion 2 and a lower portion 3 which are separate from each other. The upper and lower mold portions 2 and 3 define therebetween an annular cavity 4 formed by their cavity walls 5 and a gate 6 leading to the cavity 4 when they are joined together along a parting line. The upper mold portion 2 has a vent hole 7 formed in its final filling portion which is the last portion to be filled with a polyurethane material.

The vacuum casing 11 comprises an upper portion 12 and a lower portion 13 which are separate from each other. The upper mold portion 2 is mounted in the upper casing portion 12, and the lower mold portion 3 is supported in the lower casing portion 13. The upper and lower casing portions 12 and 13 are connected to a clamping device not shown, and the lower casing portion 13 is vertically movable to be joined with, or separated from the upper casing portion 12 to thereby join the upper and lower mold portions 2 and 3, or separate them from each other. The upper casing portion 12 has an O-ring 14 held in a groove formed in its parting surface, so that the O-ring 14 may engage the parting surface of the lower casing portion 13 to form a seal between the upper and lower casing portions 12 and 13 when the casing 11 is closed.

The lower casing portion 13 is provided with a suction plug 15 to which a vacuum pump 18 is connected through a suction hose 16 and a valve 17. The lower casing portion 13 has a gastight window 19 through which the vent hole 7 and its vicinity are visible from outside the vacuum casing 11.

The material injection mechanism 21 includes a six-component mixing head (not shown) which comprises two three-component mixing heads connected to a central injection mechanism 55 (see Japanese Patent Application Laid-open Specification No. 9-207168). One three-component mixing head is used for preparing a non-yellowing surface-forming polyurethane material U1, and can mix a polyol component, an isocyanate component and a third component. The other three-component mixing head is used for preparing an inner-forming polyurethane material U2 (an ordinary yellowing material), and can mix a polyol component, an isocyanate component and a third component, similar to the former. The central injection mechanism 55 ends in an injection nozzle 57, which extends through a through hole 40 formed in a wall of the lower casing portion 13, and is connected to the gate 6 in the lower mold portion 3. A plurality of O-rings 50 form a seal between the injection mechanism 55 and the through hole 40.

The process embodying this invention using the above-described molding apparatus will now be described in the order of its steps for the manufacture, by a RIM process, of a two-colored polyurethane covering.

(1) The upper and lower mold portions 2 and 3 of the mold 1 are separated from each other, and a mold release agent is applied to the cavity walls 5. In case the surface-forming polyurethane material U1 contains an appropriate amount of mold release agent, this step of applying the mold release agent can be omitted.

(2) A metal core 46 for a steering wheel 45 is set in the lower mold portion 3, and the upper and lower mold portions 2 and 3 are joined together to form the cavity 4, while the upper and lower casing portions 12 and 13 are joined together to close the vacuum casing 11 tightly.

(3) The vacuum pump 18 is driven to evacuate the vacuum casing 11 to an appropriate vacuum degree to create about the same vacuum degree in the cavity 4 by drawing out air through the vent hole 7 and a clearance between parting line surfaces. As for vacuum degree within the cavity 4, 10 to 100 Torr is preferable.

(4) Step of Injecting a Surface-forming Material:

In one three-component mixing head of the six-component mixing head, a polyol component (for instance, mixture of a polyol, a chain extender, and an organic bismuth catalyst or the above-mentioned mixed catalyst), an isocyanate component (an HDI trimer wherein content of oligomer, which is equal to or higher than a pentamer, is restricted to 0 to 50% by weight and 3 to 10% by weight of monool is added), and a coloring agent as a third component collide and get mixed with each other to form a non-yellowing surface-forming polyurethane material U1.

The non-yellowing polyurethane material U1 is discharged through the injection nozzle 57 of the injection mechanism 55, and injected through the gate 6 into the cavity 4 maintained at a reduced pressure, as shown in FIG. 1. A sudden pressure drop to which the non-yellowing polyurethane material U1 having an elevated pressure is subjected upon injection causes the bumping of naturally adsorbed gases in the material U1 and thereby its scattering in the cavity 4 to form a film adhering to substantially the whole surfaces of the cavity walls 5 as the surface portion (outer surface layer) 48 of a polyurethane covering 47.

The injected non-yellowing surface-forming polyurethane material U1 is allowed to cure for a curing time. It does not need to be cured or harden completely, but may be allowed to be cured to an extent that it may not be carried away by the streams of the inner-forming polyurethane material U2 when the inner-forming material is subsequently injected. Though the surface-forming polyurethane material U1 of the present embodiment is a non-yellowing material using an HDI trimer, which usually has a lower rate of urethane reaction, an urethane reaction proceeds promptly after its adherence to the cavity walls since it contains an organic bismuth catalyst or the above-mentioned mixed catalyst, which acts on the non-yellowing material specifically. Accordingly, curing time is hardly needed, and it can be shortened to about 0.05 seconds.

(5) Step of Injecting an Inner-forming Material:

In the other three-component mixing head of the six-component mixing head, a polyol component (for instance, polyether polyol containing a chain extender, a catalyst and the like), an isocyanate component (for instance, 4, 4'-diphenylmethane diisocyanate), and a third component, if any, collide and get mixed with each other to form an optional inner-forming polyurethane material U2.

Figure 2:
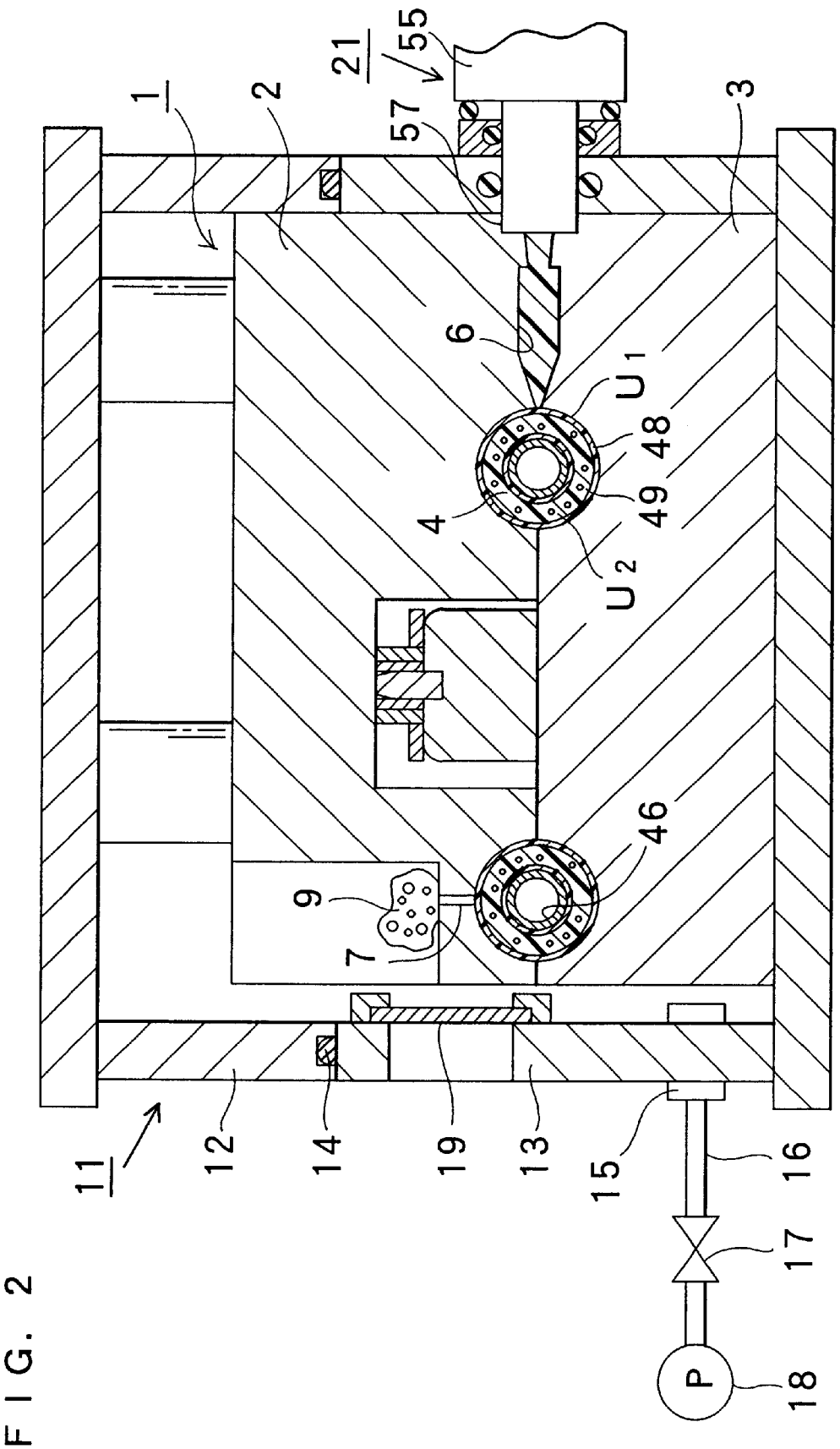
FIG. 2 is a sectional view showing the step of forming an inner portion of the same polyurethane covering in the same process.

The polyurethane material U2 is discharged through the injection nozzle 57, and injected through the gate 6, which is the same as was used in the step of injecting a surface-forming material, into the cavity 4 maintained at a reduced pressure, as shown in FIG. 2. The injected polyurethane material U2 in a region far from the cavity walls 5 forms a highly foamed core as a result of the bumping of naturally adsorbed gases in an environment having a reduced pressure. The material U2 near the cavity walls 5 forms a low foamed self-skin layer of high density by the degassing caused by the reduced pressure. The core and self-skin layer constitute the inner portion (inner layer) 49 of the polyurethane covering 47 (see FIG. 5). As a result, the cavity 4 is filled with all of the materials U1 and U2, and a small amount of the polyurethane material U2 at the leading ends of its streams flows out through the vent hole 7 and forms a solidified outflow 9.

The surface portion 48 does not have its thickness reduced to an extent that would allow the inner portion 49 to be seen through even the part formed in the vicinity of gate 6. This is the case because of the intervening step, the surface portion 48 is sufficiently solid so as not to be carried away by the streams of the inner-forming polyurethane material U2.

Figure 3:
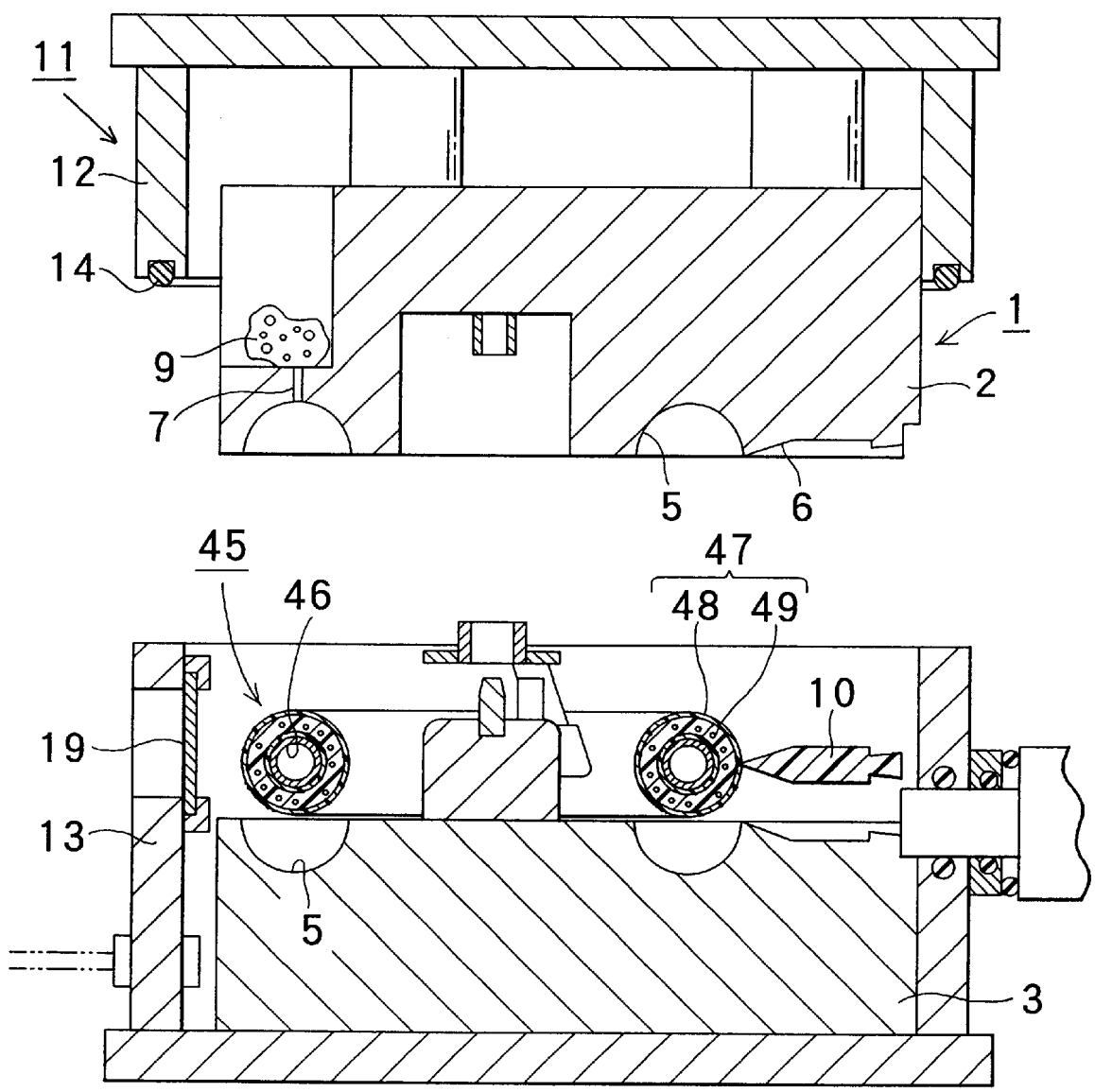
FIG. 3 is a sectional view showing the step of removing a molded product from the mold in the same process.
Figure 4A:
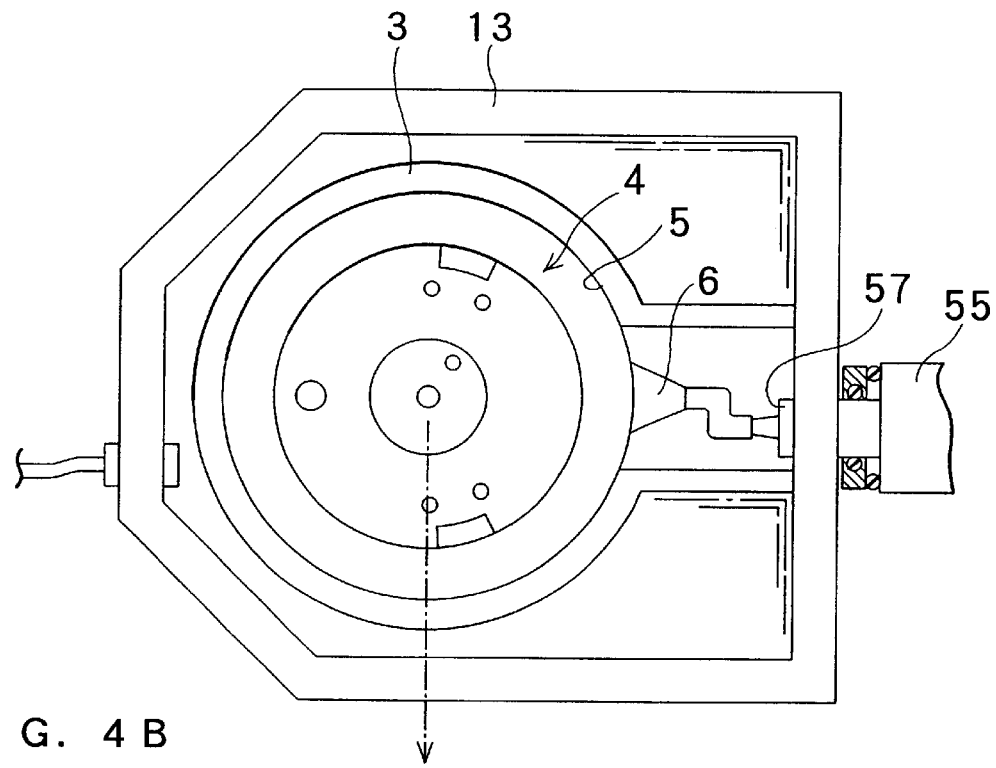
FIG. 4A is a top plan view of the lower mold portion.
Figure 4B:
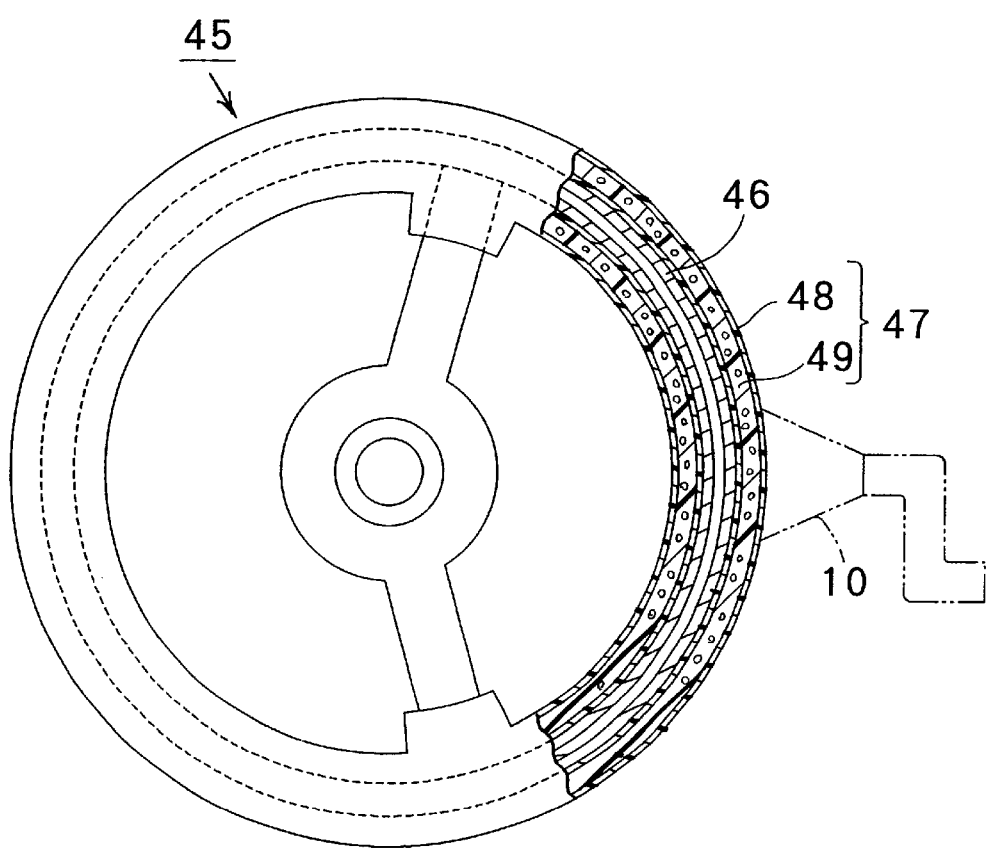
FIG. 4B is a top plan view, partly in section, of the molded product removed from the mold.

(6) Step of Removing the Molded Product From the Mold:

After the inner-forming polyurethane material U2 has been allowed to cure, the upper and lower mold portions 2 and 3 are separated from each other, while the upper and lower casing portions 12 and 13 are separated from each other, as shown in FIG. 3, and the steering wheel 45 having the polyurethane covering 47 is removed from the mold, as shown in FIG. 4B. The polyurethane covering 47 has a gate burr 10 formed by the inner-forming polyurethane material U2 in the gate 6, so the gate burr 10 is cut off.

Figure 5:
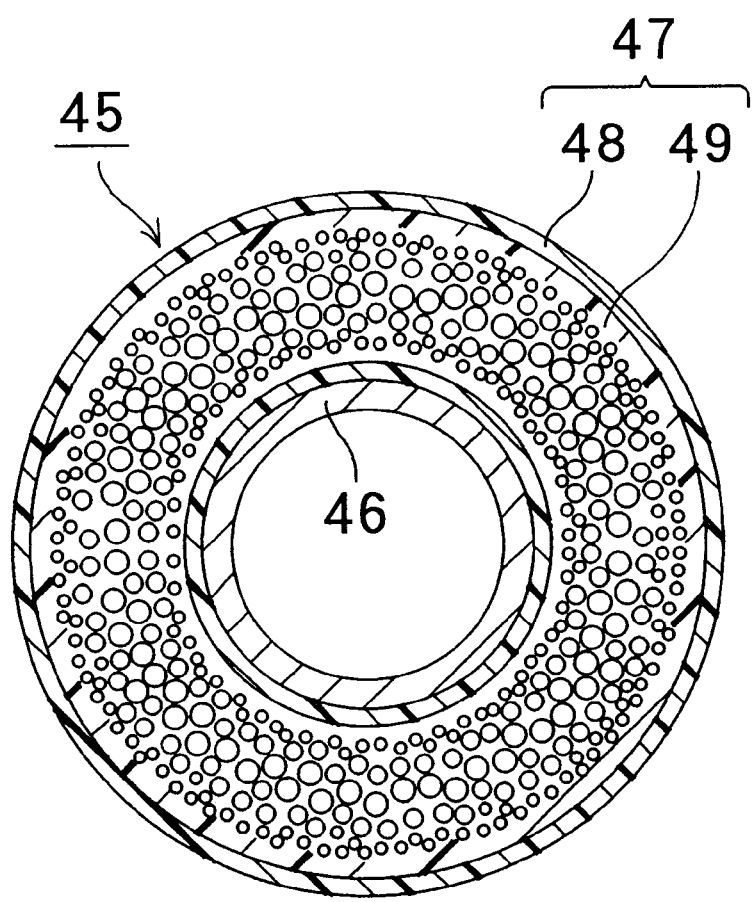
FIG. 5 is a cross-sectional view of a two-colored polyurethane covering molded by the same process.

According to the thus-molded two-colored polyurethane covering 47 by RIM, the surface portion 48 formed from the surface-forming RIM polyurethane material U1 containing a coloring agent covers up the whole surface of the inner portion 49 as a thin film and conceals them well, as is shown in FIGS. 4B and 5. Furthermore, since the surface portion 48 is prevented from being partially reduced in thickness, the inner portion 49 is not visible through the surface portion 48, and the color density of the surface portion 48 does not become uneven, thereby preventing the outward appearance of the covering 47 from being damaged. As a result, according to the present embodiment, the step of applying a coloring agent to the cavity wall 5 prior to injection molding is eliminated to thereby realize a shortened molding cycle and overcome any problem of deburring.

Furthermore, with the surface-forming RIM polyurethane material U1 having the composition of the present embodiment, the resulting surface portion 48 shows improvements in properties such as no yellowing, wear resistance, heat resistance and moisture resistance. In addition to these improvements, the surface portion 48 is high in breaking elongation, superior in flexural resistance, and not subject to cracks and breaking.

Other advantages of the present RIM process for manufacturing a two-colored molded polyurethane product are as follows.

(1) It is possible to keep the amount of the coloring agent to a minimum and thereby cut down the overall cost of manufacture.

(2) The pigment particles which the coloring agent contains wear those parts of the material injection mechanism 21 through which they pass, and any worn part has to be changed to a new one. Since the amount of coloring agent being used can be kept to a minimum, however, it is possible to delay such wear and prolong a cycle for the maintenance of the material injection mechanism 21 and the change of any worn part thus reducing the relevant work and cost.

(3) It is also possible to decrease the use of additives, such as an aging inhibitor, with the inner-forming polyurethane material U2.

EXAMPLES

In order to ascertain the effects of this invention, the above-described one three-component mixing head of the six-component mixing head was employed to mix and form a non-yellowing surface-forming polyurethane material whose composition is shown in Table 1 below. The resulting material was injected into a cavity of a mold (not shown) used only for samples, which was under a reduced pressure of 30 Torr, and a board-shaped sample (not shown) having a thickness of 5 mm was formed by RIM process. The polyol component and isocyanate component were maintained at 40° C. before got mixed. In Comparative Example 1, a general HDI trimer, wherein content of oligomer, which is equal to or higher than a pentamer, exceeds 50% by weight, and no monool is added, was used. In Examples 1 and 2, an HDI trimer, wherein content of oligomer, which is equal to or higher than a pentamer, is restricted to 43 or 26% by weight, and 4.8 or 4.5% by weight of monool is added, was used.

TABLE 1

|  |  | Comparative Example 1 | Example 1 | Example 2 |
|---|---|---|---|---|
| Polyol Component | polyether polyol (wt part) | 100 | 100 | 100 |
|  | diethylene glycol (wt part) | 27 | 27 | 27 |
|  | metal catalyst (wt part) | 1 | 1 | 1 |
| Isocyanate Component | HDI trimer (wt part) | 125 | 127 | 121 |
|  | (oligomer, which is equal to or higher than a pentamer; wt %) | (52) | (43) | (26) |
|  | (monool; wt %) | (0) | (4.8) | (4.5) |
| Breaking Elongation (%) |  | 40 | 70 | 46 |

One of hydroxyl value 36 was used as a polyether polyol. Diethylene glycol was used as a chain extender. Bismuth neodecanoate (one of the organic bismuth catalyst) was used as a metal catalyst. Each numerical value of oligomer, which is equal to or higher than a pentamer, and monool shows percent by weight for 100% by weight of HDI trimer. Breaking elongation, which was in accordance with JIS K6301, was measured by stamping out a No. 2 dumbbell-shaped specimen from the above described board-shaped sample and pulling the specimen with a pulling speed of 200 mm per a minute before it broke.

As shown in the results, Examples 1 and 2 were higher than Comparative Example 1 in breaking elongation. This is thought to be because content of oligomer, which is equal to or higher than a pentamer, was restricted to 0 to 50% by weight, and 3 to 10% by weight of monool was added, to thereby decrease the number of functional groups, which lowers the crosslinking density and heighten the elongation.

As many apparently widely different embodiments of this invention may be made without departing from the spirit and scope thereof, it is to be understood that the invention is not limited to the specific embodiments thereof except as defined in the appended claims.

What is claimed is:

1. A polyurethane material comprising, as ingredients, the following:

a hexamethylene diisocyanate trimer containing an oligomer content, said oligomer being equal to or higher than a pentamer, said oligomer being present in said hexamethylene diisocyanate trimer in an amount up to 50% by weight based on 100% by weight of said hexamethylene diisocyanate trimer;

at least one polyol; and 3 to 10% by weight of at least one monool, based on 100% by weight of said hexamethylene diisocyanate trimer.

2. A molded product molded from a polyurethane material by reaction injection mold, said polyurethane material comprising, as ingredients, the following:

a hexamethylene diisocyanate trimer containing an oligomer content, said oligomer being equal to or higher than a pentamer, said oligomer being present in said hexamethylene diisocyanate trimer in an amount up to 50% by weight based on 100% by weight of said hexamethylene diisocyanate trimer;

at least one polyol; and 3 to 10% by weight of at least one monool, based on 100% by weight of said hexamethylene diisocyanate trimer.

3. A two-colored molded product of polyurethanes molded by reaction injection molding, said product comprising:

a surface portion formed by injecting a small amount of a surface-forming polyurethane material into a mold cavity under reduced pressure, said material comprising, as ingredients, the following:

a hexamethylene diisocyanate trimer containing an oligomer content, said oligomer being equal to or higher than a pentamer, said oligomer being present in said hexamethylene diisocyanate trimer in an amount up to 50% by weight based on 100% by weight of said hexamethylene diisocyanate trimer;

at least one polyol; and 3 to 10% by weight of at least one monool, based on 100% by weight of said hexamethylene diisocyanate trimer; and an optional inner portion formed by injecting an inner-forming polyurethane material into said cavity under reduced pressure.

* * * * *